US011554336B2

(12) United States Patent
Snell et al.

(10) Patent No.: US 11,554,336 B2
(45) Date of Patent: Jan. 17, 2023

(54) LIVESTOCK FACILITY AIR FILTRATION MOUNTING SYSTEM

(71) Applicants: Lloyd D. Snell, Ames, IA (US); Nathan D. Fleege, Denver, CO (US)

(72) Inventors: Lloyd D. Snell, Ames, IA (US); Nathan D. Fleege, Denver, CO (US)

(73) Assignee: Barntools, LLC, West Des Moines, IA (US)

( * ) Notice: Subject to any disclaimer, the term of this patent is extended or adjusted under 35 U.S.C. 154(b) by 207 days.

(21) Appl. No.: 16/879,379

(22) Filed: May 20, 2020

(65) Prior Publication Data
US 2020/0368660 A1 Nov. 26, 2020

Related U.S. Application Data

(60) Provisional application No. 62/850,060, filed on May 20, 2019.

(51) Int. Cl.
B01D 46/00 (2022.01)
B01D 46/16 (2006.01)
B01D 46/12 (2022.01)
B01D 46/62 (2022.01)
B01D 46/121 (2022.01)

(52) U.S. Cl.
CPC ....... B01D 46/0005 (2013.01); B01D 46/121 (2022.01); B01D 46/16 (2013.01); B01D 46/62 (2022.01); B01D 2265/028 (2013.01); B01D 2265/04 (2013.01); B01D 2271/02 (2013.01); B01D 2279/00 (2013.01)

(58) Field of Classification Search
CPC .. B01D 46/0005; B01D 46/62; B01D 46/121; B01D 46/01; B01D 46/06; B01D 2265/028; B01D 2265/04; B01D 2271/02; B01D 9/00; B01D 2265/05; B01D 2265/025; B01D 2265/024; B01D 2265/022; B01D 46/58; B01D 46/0002; B01D 46/0009; B01D 46/0006; F24F 13/28
USPC .................................................. 55/494, 497
See application file for complete search history.

(56) References Cited

U.S. PATENT DOCUMENTS

| | | | |
|---|---|---|---|
| 6,955,696 B1 | 10/2005 | Ost et al. | |
| 8,747,505 B2 | 6/2014 | Clarcor | |
| 9,049,839 B2 | 6/2015 | Clarcor | |
| 9,126,135 B2 | 9/2015 | Clarcor | |
| 9,185,877 B2 | 11/2015 | Clarcor | |
| 9,540,557 B2 | 1/2017 | Nappa et al. | |
| 9,687,766 B2 | 6/2017 | Clarcor | |
| 11,027,230 B2 | 6/2021 | Graves et al. | |
| 2012/0317941 A1* | 12/2012 | Crabtree | A01K 1/0064 55/385.2 |
| 2017/0363318 A1* | 12/2017 | White | F24F 13/28 |
| 2018/0345193 A1* | 12/2018 | Graves | B01D 46/001 |

* cited by examiner

Primary Examiner — Robert A Hopkins
Assistant Examiner — Qianping He
(74) Attorney, Agent, or Firm — Jordan Meggison-Decker; BrownWinick Law Firm

(57) ABSTRACT

A livestock facility air filter grid system comprising perimeter vertical and horizontal stiffener plates and interlocking horizontal and vertical field stiffener plates which provides an improved sealed assembly and eliminates the potential for direct air by-pass of the filters.

28 Claims, 9 Drawing Sheets

LIVESTOCK FACILITY AIR FILTRATION MOUNTING SYSTEM

CROSS REFERENCE TO RELATED APPLICATIONS

This patent application claims priority to U.S. Provisional Patent Application No. 62/850,060 filed on May 20, 2019, the entirety of which is incorporated herein fully by reference.

FIELD OF THE DISCLOSURE

Barn air filtration is an important part of modern animal confinement buildings, animal wellbeing and business economics. Addition of MERV 14, MERV 15, MERV 16, and High-Efficiency Particulate Air (HEPA) filtration has proven to reduce the spread and occurrence of air-borne viruses, such as, Porcine Reproductive and Respiratory Syndrome (PRRS) in the United State swine markets.

Air filtration systems are utilized in both positive and negative barn systems.

The positive air filtration systems control maintains higher pressure differential between the building interior and exterior air pressure. All air is filtered through a filtering room. The filtered air then exits the building through vents and discontinuities in the building structure at a rate lower than the input, i.e., resulting in pressure.

A negative pressure barn draws air from the interior space and discharges to the atmosphere. Filtration at the inlet vents filters the incoming air. This design requires the entire building to be airtight, and any failure in the barn will result in unfiltered air entering the animal area.

Barn air filtration systems consist of a filter, retained in a structure, and the structure sealed and secured to the barn structure. Critical to the performance of an air filtration system is the ability of all components to provide a 100-percent seal to all mating components. The filter media must be perfectly bonded to filter frame; filter frame must seal to the filter mounting frame (also referred to as a grid); and the filter mounting frame (grid) must seal to the barn structural members. To improve performance, sealants are commonly applied to potential, or known leakage paths in filter, grid assemblies, and bonding surfaces. Any failure of the sealing in the filter, mating surfaces, or retaining structure can result in direct air by-pass of the filters and the air-borne virus exposure.

BACKGROUND OF THE DISCLOSURE

Current art teaches the use modular components, plastic components filter structures, flat packing to minimize cost but rely heavily on seals and sealants during final assembly to provide bio-security (See Crabtree U.S. Pat. No. 9,049,839; Crabtree et al. U.S. Pat. No. 9,185,877; Crabtree et al. U.S. Pat. No. 9,687,766). Yet disease prevention mandates one-hundred percent filtration, and an installation with multiple joints and lots of assembly hardware are extremely susceptible to installation errors resulting in unfiltered air bypass. Furthermore, once assembled onsite, the modular grid elements require additional sealant preparation of joints and mating surfaces. The addition of sealants is an attempt at achieving a one-hundred percent barrier to non-filtered air movement. A human applied sealant manufacturing process is a proven process that fails to prevent zero defects.

Additionally, U.S. Pat. No. 9,049,839 teaches non-metallic (plastic) filter grids. Plastic, polymer filter grids and components are prone to cracking due to building settling, timber drying, and movement. This is especially accelerated when exposed to extremely low temperature in many regional area producing hogs. Any crack in a grid results in air bypassing the filter and failure of the primary bio-security objective of air filtration. Also, installation errors, such as over tightening installation hardware, create stress risers which result in crack propagation.

Non-patented designs have also been utilized in filter installations. These designs, unlike Crabtree's plastic solution, are fabricated using multiple folded and welded parts. Most notably of these assemblies is the existence of a welded joint under the filter seal. The typical manufacturing process is to weld the joint, grind smooth, and add some type of sealant. As previously noted, manual human process is not a robust zero-defect manufacturing solution. This includes welding, grinding and sealant application.

Finally, the number of filters in a large confinement operation, such as a pork production operation, requires thousands of filters per facility. A filter mounting system requiring manually turning up to 8 clips per filter significantly increases time and cost to install or replace.

BRIEF SUMMARY OF THE DISCLOSURE

The disclosure relates to a system that eliminates the reliance on operator applied sealants, welding and grinding in the filter sealing zone which will be a more bio-secure system. Furthermore, the disclosure relates to a more robust filter retaining system. The disclosure relates to a livestock facility air filter grid system comprising perimeter vertical and horizontal stiffener plates and interlocking horizontal and vertical field stiffener plates which provides an improved structural assembly and eliminates the potential for direct air by-pass of the filters. Additionally, the disclosure relates to a new system which includes materials resistant to fracture and cracking in extreme weather conditions and improves ease of installation and replacement.

Therefore, the general solution objectives for an improved livestock facility air filtration mounting system include, but are not limited to, the following:
1. providing a material and a system that eliminates the potential for deformation, cracking and failure due to building movement;
2. a material and a system that eliminates cracking and failure due to weather extremes;
3. a system that eliminates any design requirements that place a welded joint under the sealing surface of a filter;
4. a system that eliminates any design requirements that result in welding on a surface that a filter seal must contact;
5. a system that eliminates any design or manufacturing element that has a high probability of failure resulting in air bypassing the filter;
6. a system that improves the stiffness and strength of the livestock facility air filtration mounting system;
7. a system that improves the manufacturing efficiency and reduction of defects;
8. a system that improves filter installation and removal;
9. a system that provides an improved sealed assembly and eliminates the potential for direct air by-pass of the filters;
10. a system that meets or exceeds the industry biosecurity expectations with filtered air; and 11. a system that provides other improvement opportunities.

DETAILED DESCRIPTION

Figure 1:
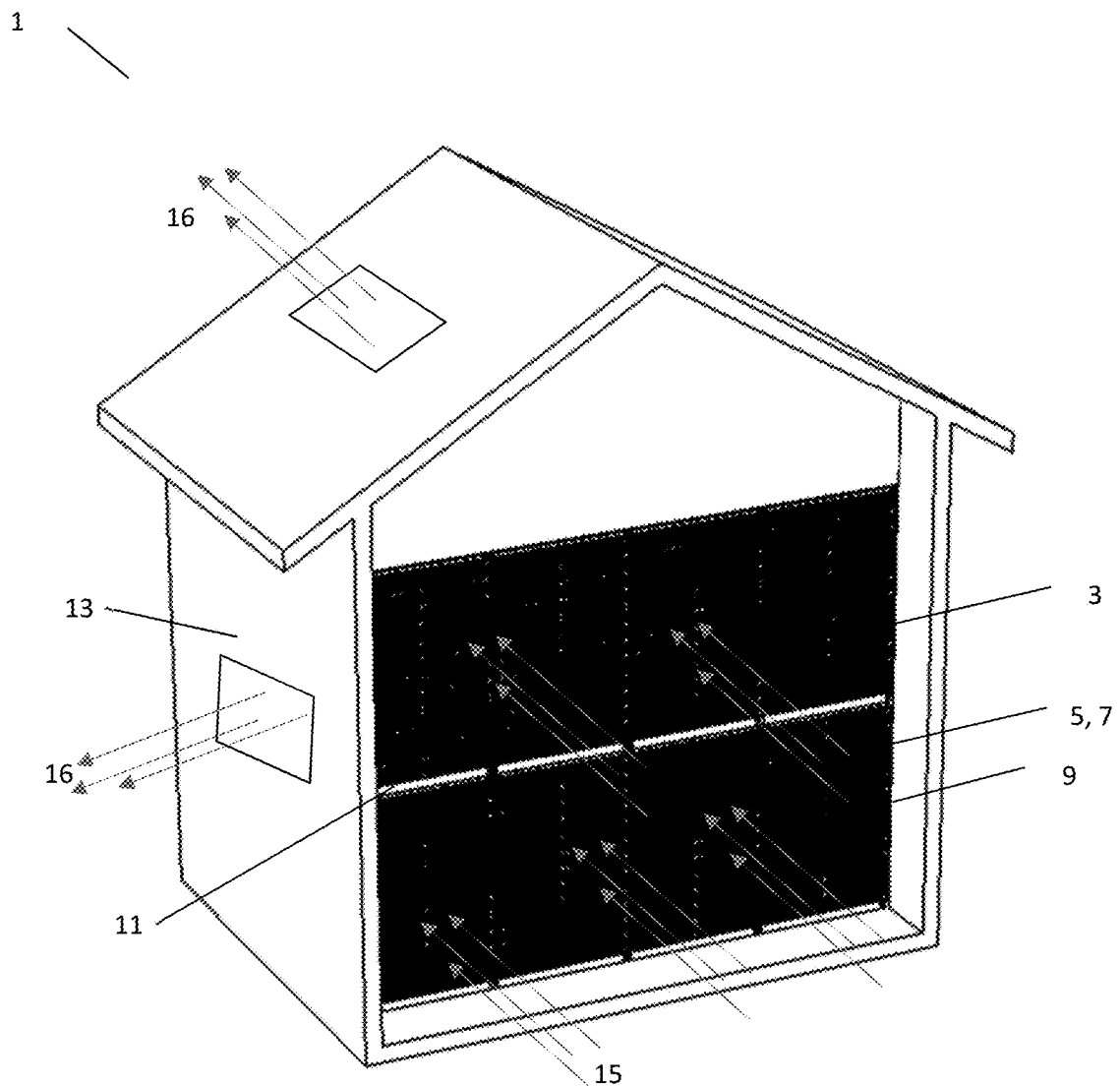
FIG. 1 depicts an isometric view of a barn assembly with an array of filter grids.

In the following detailed description of the embodiments, reference is made to the accompanying drawings which form a part hereof, and in which is shown by way of illustration specific preferred embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosures. The following detailed description is, therefore, not to be taken in a limiting sense, and the scope of the present disclosure is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the disclosure.

Livestock Facility Air Filter Grid Assembly

An air filter grid assembly 1 (also referred to as a "livestock facility air filter grid assembly", a "livestock facility air filter grid system", an "air filter grid assembly", an "air filter grid system", or a "system") may be used in any type of facility 13, building 13, operation 13, or the like without departing from the disclosure. The livestock facility air filter grid assembly 1 is shown with an array of components including, but not limited to, at least one filter grid 3; at least one primary filter 5; at least one pre-filter 7; and is secured by at least one screw 9 through at least one slot 31 in the filter grid 3 into at least one framed structure 11 of a building 13. Excluding the filter grid assembly 1, all efforts are made to ensure all air migration gaps and cracks are sealed using sealants at joints, common construction wraps, and at least one coat of spray foam insulation (not shown). The livestock facility air filter grid assembly provides an improved sealed assembly and eliminates the potential for direct air by-pass of the filters. When the assembly is used in a livestock facility, the assembly protects the housed livestock from unfiltered air which may contain air-borne viruses.

Shown throughout this disclosure, for discussion purposes, is a filter grid 3 with six (6) filter 5/7 installation locations. However, any number of filters 5/7 may be utilized without departing from the scope of the disclosure. It will be further disclosed that other filter grid mounting options exist. Furthermore, the filter grid 3 is presented in a vertical orientation. However, the filter grid 3 could be mounted horizontally or any angular orientation in between without departing from the disclosure.

The air is moved through the filter 5/7 by fans (not shown) orientated on either side of the filter grid 3 array to create a pressure differential on opposing sides of the filter. Preferred mounting is on the clean side of the filters 5/7 and a positive pressure barn system. The pressure differential across the filter media results in air flow 15 across the filter medium and filtrations of impurities. The air is discharged through barn venting systems 16.

The at least one filter grid 3 can be installed in a vertical or horizontal orientation. The at least one filter grid 3 can be installed to form an m×n array, wherein 'm' is parallel to the floor and 'n' is orientated above a lower filter grid 3 or normal to the floor. A filter grid 3 array may contain any combination of horizontal and vertical filter grids 3 without departing from the disclosure. Furthermore, it could be mounted in a non-planar wall structure.

In one embodiment, the filter grid 3 can accommodate a primary filter 5 that is a high capacity V-Filter, as shown. V-Filters are required to extend through the filter grid 3 seal plate 21 to increase the filtered surface area, maximize flow rates, and reduce air velocity to increase total filtration efficiency. However, primary filter 5 may be any type of filter without departing from the disclosure. All primary filters 5 have a filter sealing gasket (not shown) bonded to the filter's structural housing supporting the pleated material. This filter sealing gasket provides a compressible member between the filter grid 3 and the clip 30 clamping pressure providing a positive seal against air flow.

Figure 2:
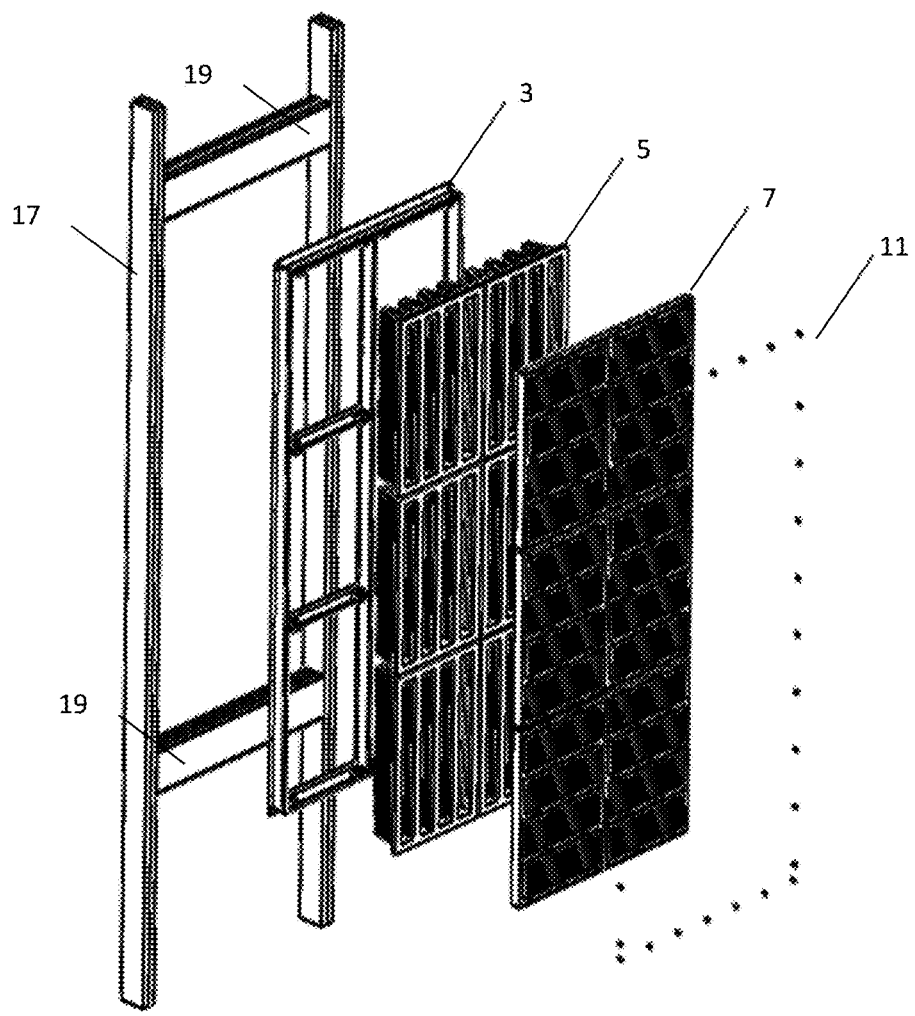
FIG. 2 depicts an exploded isometric view of the filter grid, primary filters, pre-filters, and securing hardware.

The expanded assembly shown in FIG. 2 shows the installation of the at least one filter grid 3, the at least one primary filter 5, and the at least one pre-filter 7 into the at least one building framed structure 11. The building frame structure 11 is constructed of wood studs, steel studs, structural beams, SIP panels, or any other standard or new planar construction materials and method. The filter grid 3 requires a rectangular framing opening slightly larger than the width and height of the number of primary filters 5 to be installed vertically and horizontally. The frame opening shall be of such size to allow securing the filter grid 3 to the vertical framed structure 17 and header 19 structures using a standard wood construction fastener 11. The building structure 11 shown generically represents a dimensional lumber construction consisting of at least one vertical stud 17 located on each side and parallel to the at least one filter grid 3; and at least one upper and lower header 19 horizontal and parallel to the at least one filter grid 3.

Figure 3:
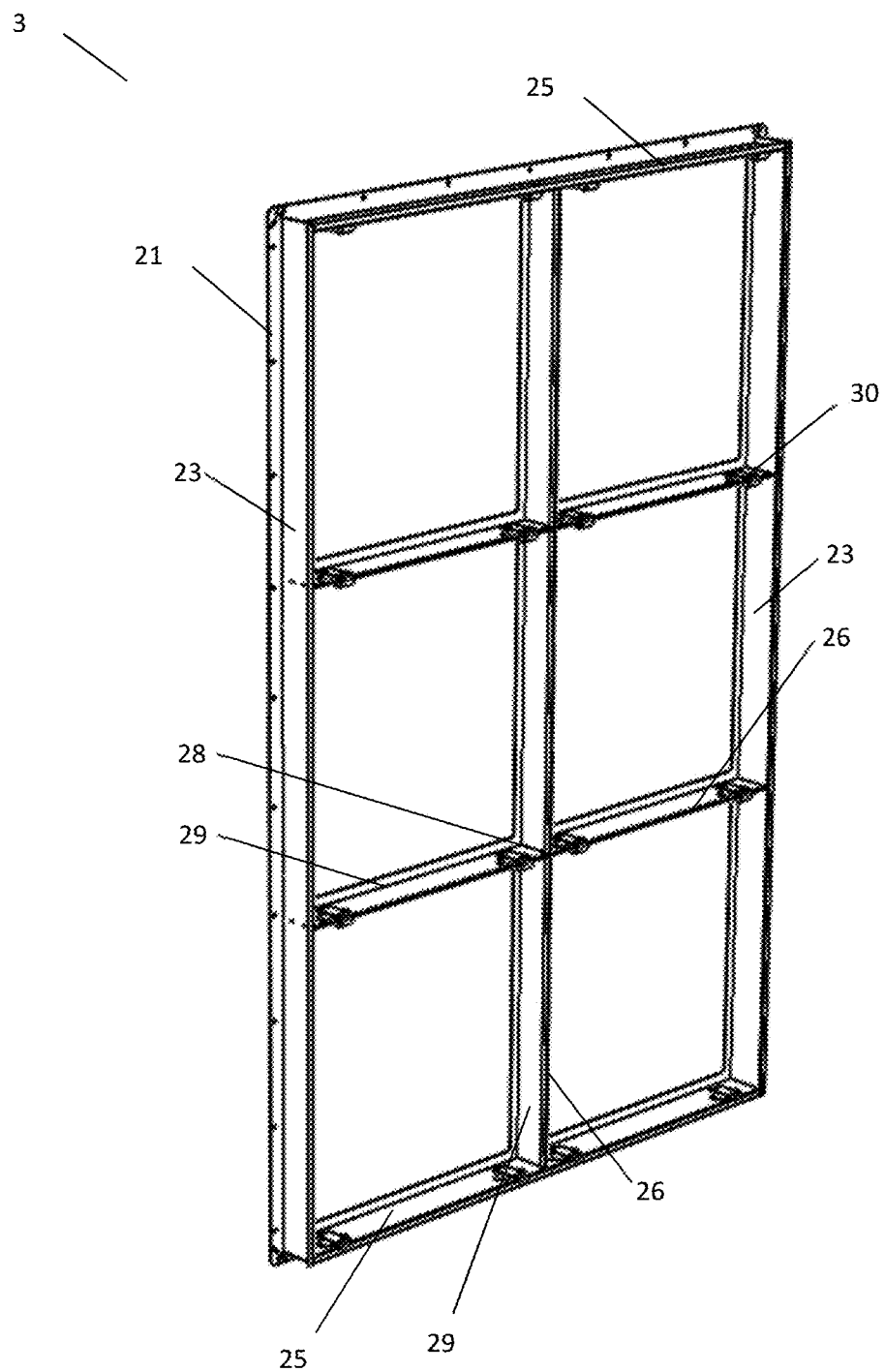
FIG. 3 depicts an isometric view of the filter grid assembly with clips.
Figure 4:
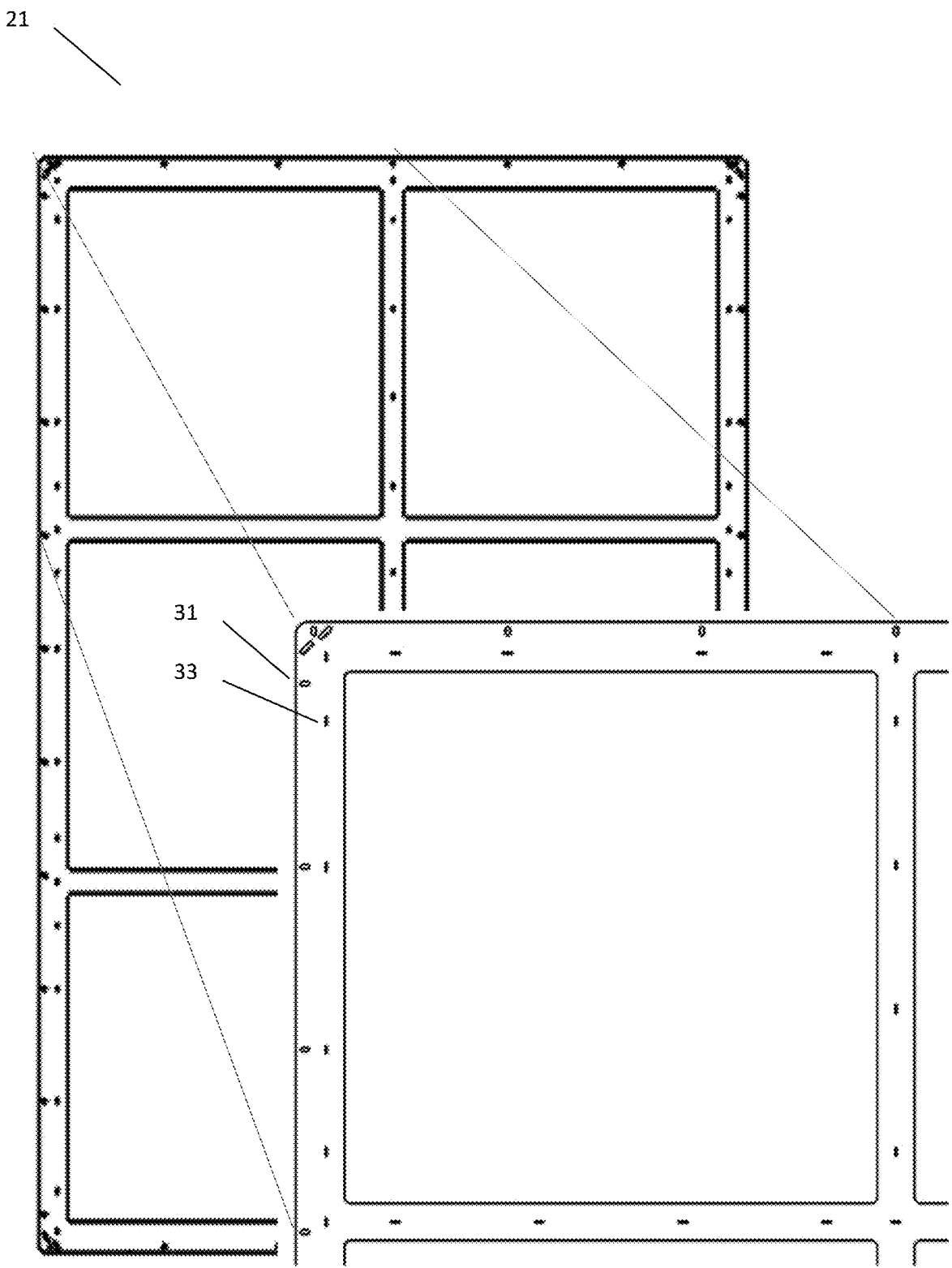
FIG. 4 depicts a detailed front view of the singular filter grid seal plate.
Figure 5:
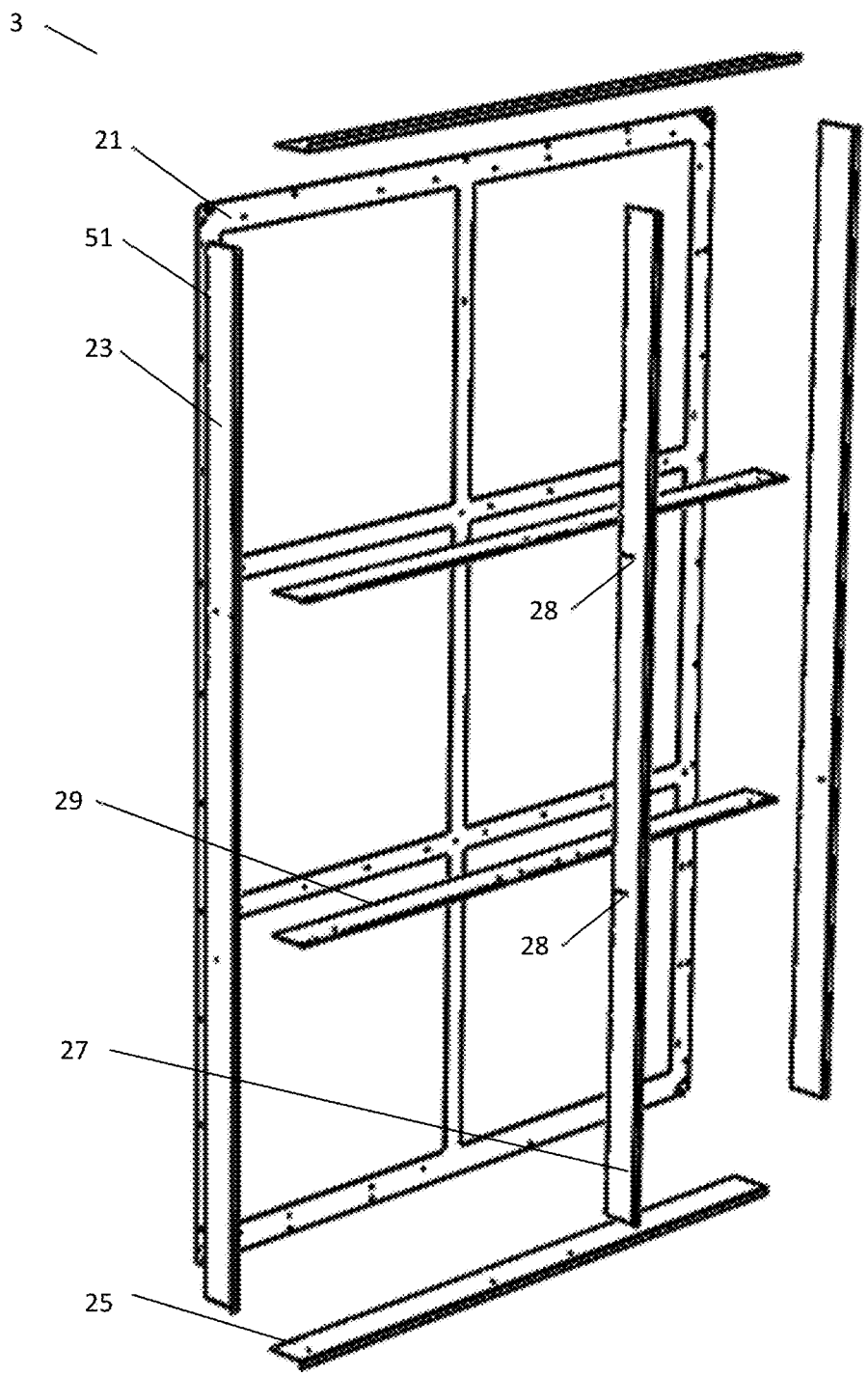
FIG. 5 depicts an exploded view of the filter grid assembly.
Figure 6:
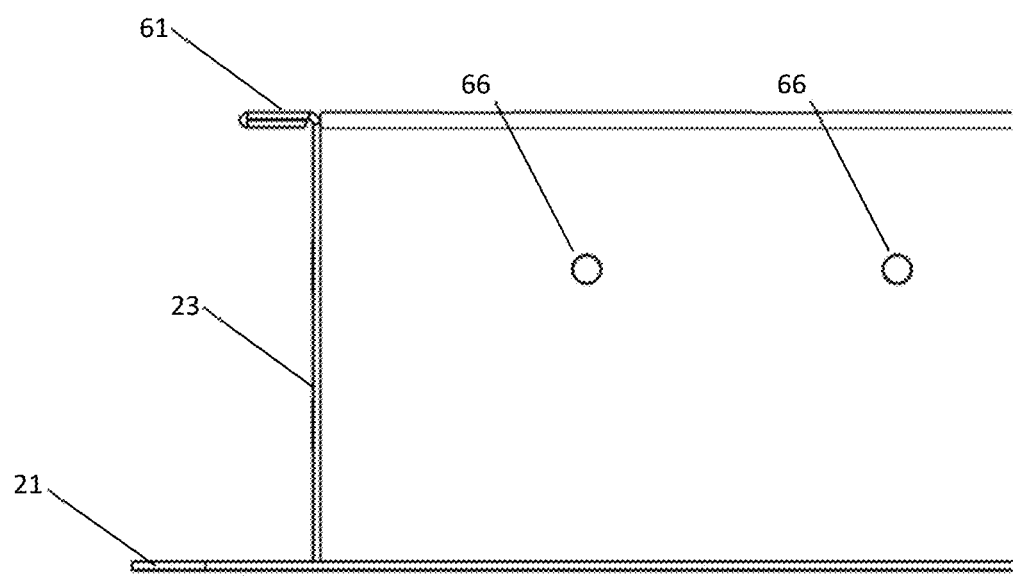
FIG. 6 depicts a section view of the vertical exterior perimeter structural member.
Figure 7:
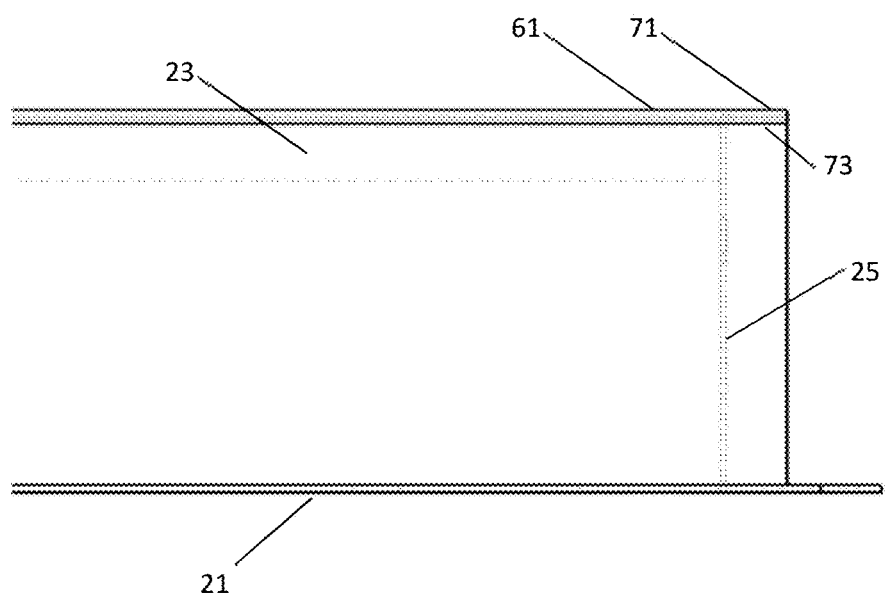
FIG. 7 depicts a section view, with hidden lines, of the horizontal and vertical perimeter structural members' corner structure.
Figure 8:
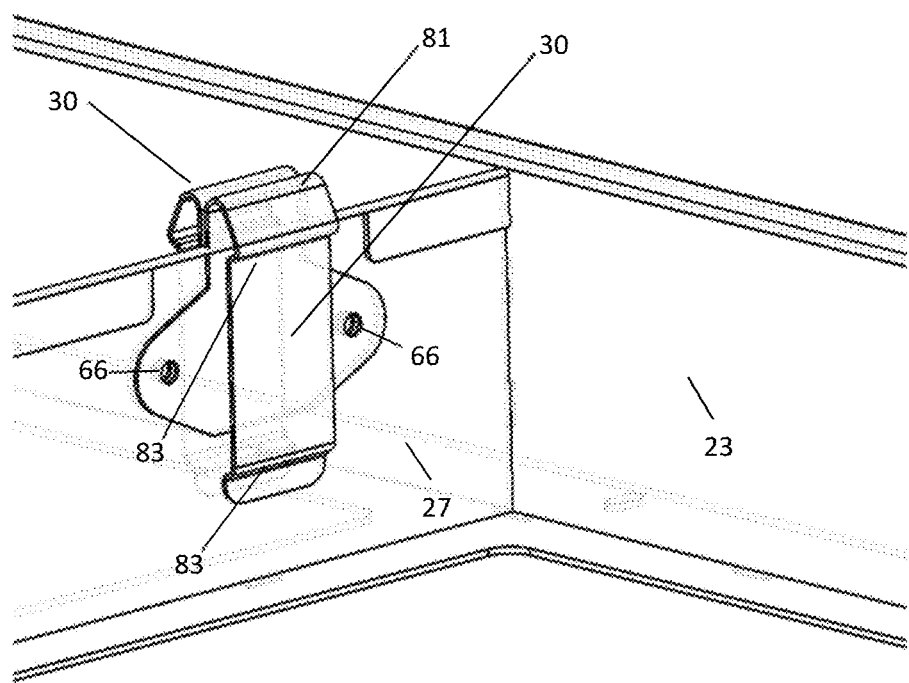
FIG. 8 depicts an isometric view of two filter clips mounted to filter grid assembly.
Figure 9:
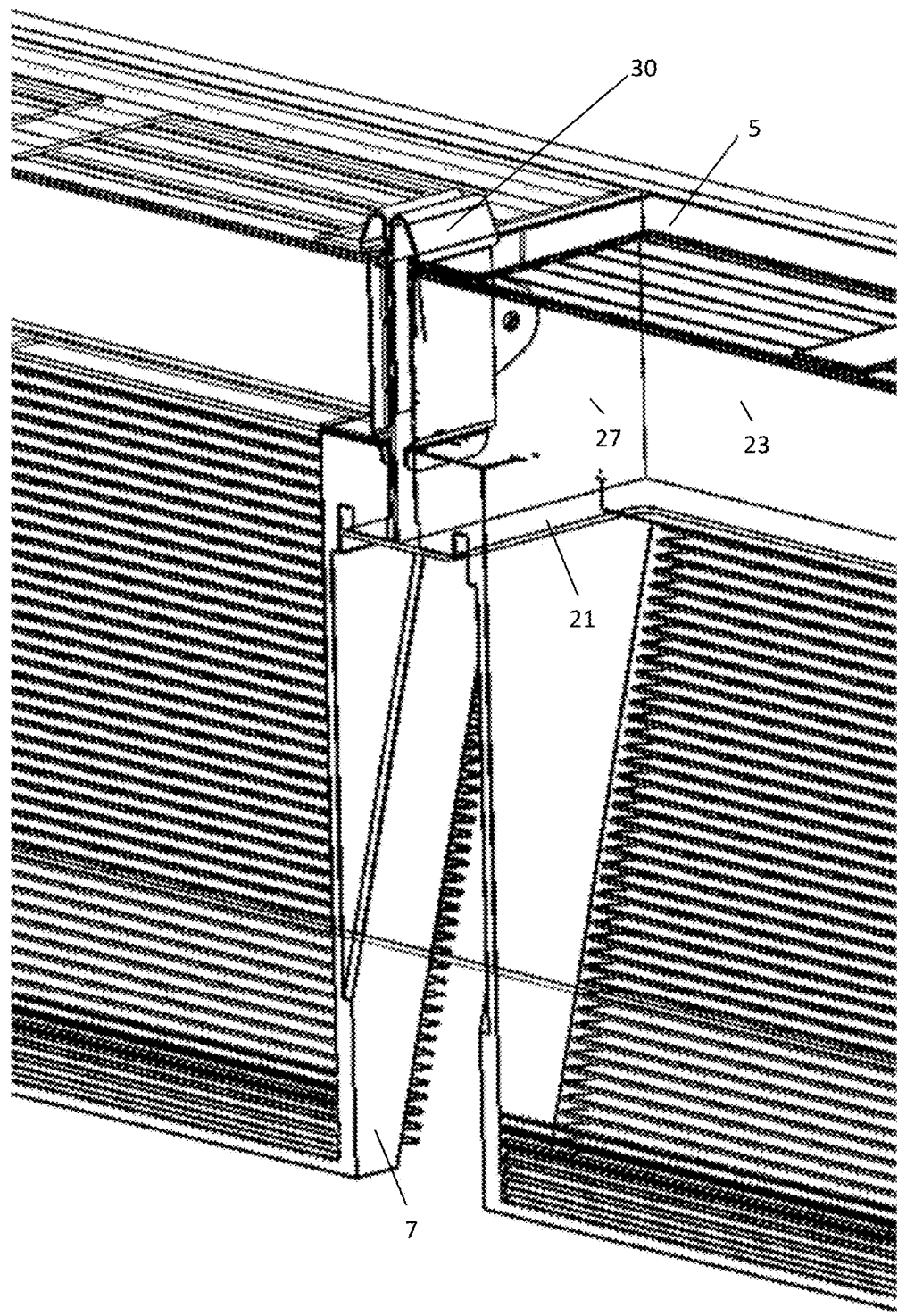
FIG. 9 depicts a cross sectional view showing the filter retention with a clip.

In one embodiment, as shown in FIG. 3, the filter grid 3 is a precision welded assembly of stainless steel. The seal plate 21 is cut from a single sheet of stainless steel and contains an at least one approximately square hole. The hole allows at least one primary filter 5 to extend through this space if required. The single sheet eliminates any welded joints under primary filter 5 seal. Thus, this design eliminates the need to finish grind welds and apply a sealant. Elements of the seal plate 21 are disclosed below.

Attached by welding to the seal plate 21 are four (4) perimeter vertical stiffener plates 23/25. Two stiffener plates 25 are parallel and perpendicular to the other two perpendicular plates 23 and vice-versa. In one embodiment, the outer perimeter vertical stiffener plates have a folded edge 61/71 which is bent ninety (90) degrees outwards to the outer perimeter of the filter grid 3. The folded edge 61/71 has an additional bent edge which is bent one-hundred and eighty (180) degrees, referred to as a safety hem 26/73. These two bends provide the rigidity required to prevent filter grid 3 deformation during shipping, installation, and operation. Other formed geometries, heights, thickness and materials could be used to change the structural and intrinsic properties of the filter grid assembly 3 without departing from the disclosure. In one embodiment, at least one field vertical and at least one field horizontal stiffener plates 27/29 are attached to the perimeter vertical and horizontal stiffener plates 23/25. Additionally, the field vertical and horizontal stiffener plates 27/29 have a longitudinally extending folded edge referred to as a safety hem to increase stiffness and safety.

All perimeter vertical stiffener plates 23/25 have at least one tab 51 that interlocks in a slot 33 on the seal plate 21 mating surface. For clarification, the perimeter vertical stiffener plates 23/25 may have any number of tabs 51 without departing from the disclosure. These tabs 51 fit precisely and tightly within slot 33 cut into the face mating plate 21. Furthermore, the tab 51 and slot 33 fit are designed to allow TIG welding the seal plate 21 with vertical stiffener components 23/25 without the use of additional filler material.

The field vertical stiffener plates 27/29 have a singular edge which is bent one hundred and eighty (180) degrees, referred to as a safety hem 26, on the edge extending from the seal plate 21. The safety hem 26 provides both greater strength and safety for operators loading or unloading filters. The horizontal and vertical field stiffener plates 27/29 are inversely notched 28 to interlock and be welded at this location. Additional tabs 51 are located on the ends of the field vertical stiffener plates 27/29 and fit similarly with the slots 33 located on the mating perimeter horizontal and vertical stiffener plates 23/25.

All perimeter vertical and horizontal stiffener plates 23/25 have at least one tab 51 that interlocks in a slot 33 on the seal plate 21 mating surface. For clarification, the perimeter vertical stiffener plates 23/25 may have any number of tabs 51 without departing from the disclosure. All field vertical and horizontal stiffener plates 27/29 have at least one tab 51 that interlocks in a slot 33 on the seal plate 21 mating surface. For clarification, the perimeter vertical stiffener plates 23/25 may have any number of tabs 51 without departing from the disclosure. These tabs 51 fit precisely and tightly within slot 33 cut into the face mating plate 21. Furthermore, the tab 51 and slot 33 fit are designed to allow TIG welding the seal plate 21 with stiffener components 23/25/27/29 without the use of additional filler material.

Furthermore, the field vertical and horizontal stiffener plates 27/29 may be made of any material without departing from the disclosure. The field vertical and horizontal stiffener plates 27/29 may be made of any material which is sufficiently strong for resisting building movement, deflection due to differential air pressure, temperature related expansion and contraction, and corrosion. In one embodiment, the field vertical and horizontal stiffener plates 27/29 may be made of stainless steel.

Critical to performance is all weld of tabs 51 that extent through slots 33 located in the seal plate 21 are critical to performance. All weld located in seal plate 21 should be tested for leaks.

All perimeter vertical stiffener plates 23/25 are MIG or TIG welded on the exterior edge of the connecting corners. The primary filter 5 seals to the continuous surface located between the perimeter 23/25 and field stiffener plates 27/29.

In one embodiment, spaced around the perimeter of the seal plate 21 are slotted holes 31 that are used to secure the filter grid 3 to the building structure 11. During installation, a sealant is placed on the mating face of the filter grid 3 and the building material 17/19. The slotted holes 31 provide for limited planar movement, preventing buckling and biosecurity failure. This design minimizes the use of sealant to only joints that occur in the building framed structure, i.e., between the filter grid 3 and the building structure 11/13. The filter grid 3 requires no sealant during manufacturing.

At least one clip 30 is used to retain and position both the primary filter 5 and pre-filter 7 securely to the seal plate 21. The clips 30 have at least one mounting hole 66 with the at least one mounting hole 66 located on the perimeter and field vertical stiffener plates 23/25/27/29. The at least one clip 30 has a flexible section 81 that allows filters 5/7 to be installed or removed by pushing or pulling. This greatly increases the efficiency of the installation and service of filters. The filter assemblies 5/7 are retained in position by the force created by the flexible section and the contact surface 83 against the filter 5/7 housing perimeter edge. The clip 30 contact surface is angled or radius in relation to the edge of the filter 5/7 providing a compound force which centers the primary filter 5 firmly against the seal plate 21. This design requires no welding in any location in which the primary filter 5 seal seats against the seal plate 21. Additionally, the perimeter and the field vertical stiffener plates 23/25/27/29 provide both structural strength and mounting location for the clip 30.

In one embodiment, the filter grid 3 is manufactured from stainless steel to provide strength and resistance to failure due to crack caused by extreme cold temperature. However, the filter grid 3 may be manufactured from any other material, without limitation, such as galvanized steels.

The filter grid 3 can be designed and manufactured to securely mount without air bypass for 1, 2, ..., $n^{th}$ filters 5/7. In addition, the design achieves this multiple filter solution without assembly and assembly-joints common with modular filter mounting solutions.

For clarification, all variables are scalable to meet the performance requirements of the animal housing facility without departing from the disclosure.

Seal Plate

In one embodiment, the livestock facility air filtration mounting system 1 comprises a seal plate 21. The system 1 may comprise any number of seal plates 21 without departing from the disclosure. Seal plate 21 may be formed of any material and may be any size or shape without departing from the disclosure. For example, the seal plate 21 may be made of stainless steel. The seal plate 21 will be made of a material that is sufficiently strong for resisting building movement, deflection due to differential air pressure, temperature related to expansion and contraction, and corrosion. In one embodiment, the seal plate 21 is a continuous singular planar material surface void of any welds, forms, fillers, sealers or grinding marks that bisect the primary filter seal surface. In another embodiment, for example, the seal plate 21 has at least one hole that allows the installation of a primary filter 5 such as a V-Filter.

In one embodiment, as an example, the seal plate 21 comprises a primary filter seal which contacts the defect free planar surface equally distanced around a relatively square hole and in between the at least one perimeter horizontal stiffener plate 25, the at least one perimeter vertical stiffener plate 23, the at least one field horizontal stiffener plate 29, and the at least one field vertical stiffener plate 27. Furthermore, in an embodiment, the seal plate 21 has the at least one slot 31 located on the bounded perimeter beyond the at least one perimeter vertical stiffener plate 23 and the at least one horizontal stiffener plate 25 for securing the filter mounting assembly 1 to the building structure 11 using screws 9 and sealant.

In an embodiment, the seal plate 21 comprises at least one slot 31 which is collinear with the at least one perimeter vertical stiffener plate 23 and the at least one slot 31 is collinear with the at least one perimeter horizontal stiffener plates 25. Furthermore, in an embodiment, the seal plate 21 has at least one slot 31 which is collinear with the at least one field vertical stiffener plates 27 and the at least one slot 31 is collinear with the at least one field horizontal stiffener plates 29. The at least one slot 31 receives at least one tab 51 from the at least one perimeter 23/25 and the at least one field stiffener plate 27/29 and welded.

Benefits of the System

The livestock facility air filtration mounting system 1 has many benefits and advantages including, but not limited to, providing a material and method that eliminates the potential for cracking and failure due to building movement; a material and method that eliminates cracking and failure due to weather extremes; a method that eliminates any design requirements that place a welded joint under the sealing surface of a filter; a method that eliminates any design requirements that result in welding on a surface that a filter seal must contact; a method that eliminates any design or manufacturing element that has a high probability of failure resulting in air bypassing the filter; a method that improves the stiffness and strength of the livestock facility air filtration mounting system; a method that improves the manufacturing efficiency and reduction of defects; a method that improves filter installation and removal; a method that meets or exceeds the industry biosecurity expectations with filtered air; and a method that provides other improvement opportunities.

REFERENCE NUMERALS

1—A livestock facility air filter grid assembly
3—At least one filter grid
5—At least one primary filter
7—At least one pre-filter
9—At least one screw
11—At least one framed structure of a building
13—A building
15—Air intake flow
16—Barn air outflow
17—Vertical component of the framed structure
19—Upper and lower header components of the framed structure
21—Seal plate
23—Perimeter vertical stiffener plates (which are parallel and perpendicular to the other stiffener plates 25/27/29)
25—Perimeter horizontal perimeter stiffener plates (which are parallel and perpendicular to the other stiffener plates 23/27/29)
26—Formed safety hem
27—Field vertical stiffener plates (which are parallel and perpendicular to the other stiffener plates 23/25/29)
28—Interlocking inversely notched field stiffener plates
29—Field horizontal stiffener plates (which are parallel and perpendicular to the other stiffener plates 23/25/27)
30—Clip
31—At least one mounting slot
33—At least one tab slot
51—At least one tab
61—At least one folded edge
66—At least one mounting slot
71—At least one folded edge
73—Safety hem of mating perimeter
81—At least one retaining clip flexible section
83—Clip and filter contact surface

What is claimed is:

1. A livestock facility air filter grid assembly comprising:
   at least one filter grid, the at least one filter grid comprising:
   at least one seal plate, wherein the at least one seal plate comprises a plurality of tab slots, each tab slot comprising an opening disposed within a surface of the at least one seal plate;
   a plurality of perimeter vertical and horizontal plates, wherein the plurality of perimeter vertical and horizontal plates each comprises a plurality of perimeter plate tabs arranged along a length of each of the plurality of perimeter vertical and horizontal plates, and wherein each of the plurality of perimeter plate tabs is configured to interlock with a corresponding tab slot in the at least one seal plate;
   a plurality of horizontal and vertical field stiffener plates, wherein the plurality of horizontal and vertical field stiffener plates each comprises a plurality of field plate tabs arranged along a length of each of the plurality of horizontal and vertical field stiffener plates, and wherein each of the plurality of field plate tabs is configured to interlock with a corresponding tab slot in the at least one seal plate; and
   a plurality of filter retaining clips retaining at least one primary filter and at least one pre-filter.

2. The livestock facility air filter grid assembly of claim 1, wherein the filter grid can comprise an array of at least one filter location, to an M×N matrix.

3. The livestock facility air filter grid assembly of claim 1, wherein a singular air filter grid assembly is used or an array of air filter grid assemblies is used.

4. The livestock facility air filter grid assembly of claim 1, wherein the livestock facility air filter grid assembly is mounted in walls or ceiling structures.

5. The livestock facility air filter grid assembly of claim 1, wherein the at least one seal plate is a continuous singular planar material surface void of any welds, forms, fillers, sealers or grinding marks that bisect the at least one primary filter seal surface.

6. The livestock facility air filter grid assembly of claim 5, wherein the at least one seal plate has at least one relatively square hole that allows the installation of a V-Filter.

7. The livestock facility air filter grid assembly of claim 5, wherein the at least one seal plate further comprises at least one mounting slot wherein the at least one mounting slot is located on a bounded perimeter beyond the at least one perimeter vertical stiffener plate and the at least one horizontal stiffener plate is used to planarly secure the at least one filter grid to a building structure using screws and sealant.

8. The livestock facility air filter grid assembly of claim 5, wherein the at least one seal plate is made of stainless steel.

9. The livestock facility air filter grid assembly of claim 1 wherein the plurality of perimeter vertical stiffener plates further comprise at least one tab which extends through a tab slot on the at least one seal plate for locating and welding.

10. The livestock facility air filter grid assembly of claim 1, wherein the plurality of perimeter horizontal stiffener plates have at least one tab extending through a tab slot located on the at least one seal plate for locating and welding.

11. The livestock facility air filter grid assembly of claim 1, wherein the plurality of perimeter vertical stiffener plates are perpendicular to the plurality of perimeter horizontal stiffener plates.

12. The livestock facility air filter grid assembly of claim 1, wherein the plurality of perimeter horizontal stiffener plates are perpendicular to the plurality of perimeter vertical stiffener plates.

13. The livestock facility air filter grid assembly of claim 1, wherein each of the plurality of perimeter vertical and horizontal stiffener plates comprises a first end and a second end and wherein a first end of one of the plurality of perimeter vertical and horizontal stiffener plates is connected to a second end of another of the plurality of vertical and horizontal stiffener plates by TIG or MIG welding.

14. The livestock facility air filter grid assembly of claim 1, wherein the plurality of perimeter vertical and horizontal stiffener plates each have a longitudinally extending folded edge away from the at least one filter grid to increase stiffness.

15. The livestock facility air filter grid assembly of claim 1, wherein the plurality of perimeter vertical and horizontal stiffener plates further comprise a safety hem wherein the safety hem increases stiffness and safety.

16. The livestock facility air filter grid assembly of claim 1, wherein the plurality of perimeter vertical and horizontal stiffener plates further comprise at least one tab slot colinear with an end of the plurality of field vertical and horizontal stiffener plates.

17. The livestock facility air filter grid assembly of claim 1, wherein the plurality of perimeter vertical and horizontal stiffener plates further comprise a plurality of holes to receive fasteners to secure the plurality of filter retaining clips.

18. The livestock facility air filter grid assembly of claim 1, wherein the plurality of perimeter vertical and horizontal stiffener plates are made of stainless steel.

19. The livestock facility air filter grid assembly of claim 1, wherein the plurality of field vertical and horizontal stiffener plates each has at least one tab extending through an at least one tab slot on the at least one seal plate for locating and welding.

20. The livestock facility air filter grid assembly of claim 1, wherein the plurality of field stiffener plates each has at least one tab extending through an at least one tab slot on the at least one perimeter stiffener plate perpendicular to the plurality of field vertical and horizontal stiffener plates for locating and welding.

21. The livestock facility air filter grid assembly of claim 1, wherein the plurality of field vertical and horizontal stiffener plates are inversely notched at points of intersection.

22. The livestock facility air filter grid assembly of claim 1, wherein the plurality of field vertical and horizontal stiffener plates each have a safety hem which increases stiffness and safety.

23. The livestock facility air filter grid assembly of claim 1, wherein the plurality of field vertical and horizontal stiffener plates further comprise a plurality of holes to receive fasteners to secure the plurality of filter retaining clips.

24. The livestock facility air filter grid assembly of claim 1, wherein the plurality of field vertical and horizontal stiffener plates are made of stainless steel.

25. The livestock facility air filter grid assembly of claim 1, wherein the plurality of filter retaining clips are a spring steel material that, when the at least one primary filter is installed, contacts the at least one primary filter with at least one angled surface of the plurality of filter retaining clips and applies a compound force which centers the at least one primary filter between apposing plurality of filter retaining clips and applies a force which firmly compresses a filter seal against the at least one seal plate.

26. The livestock facility air filter grid assembly of claim 1, wherein the plurality of filter retaining clips are a spring material that, when the at least one pre-filter is installed, contacts the at least one pre-filter with at least one angled surface of one of the plurality of filter retaining clips and applies a compound force which centers the at least one pre-filter between apposing plurality of filter retaining clips and applies a force which firmly sets the at least one pre-filter against the at least one primary filter.

27. The livestock facility air filter grid assembly of claim 1, wherein one of the plurality of filter retaining clips and another of the plurality of filter retaining clips are attached in a mirrored pair on at least one of the plurality of perimeter horizontal stiffener plates and the at least one of the plurality of field horizontal stiffener plates.

28. The livestock facility air filter grid assembly of claim 1, wherein one of the plurality of filter retaining clips and another of the plurality of filter retaining clips are attached in a mirrored pair on at least one of the plurality of perimeter vertical stiffener plates and the plurality of field vertical stiffener plateU.

* * * * *